C. B. BENSON.
COMBINED SEED GRADER, CLEANER, AND PURIFIER.
APPLICATION FILED JULY 20, 1909.
965,683. Patented July 26, 1910.
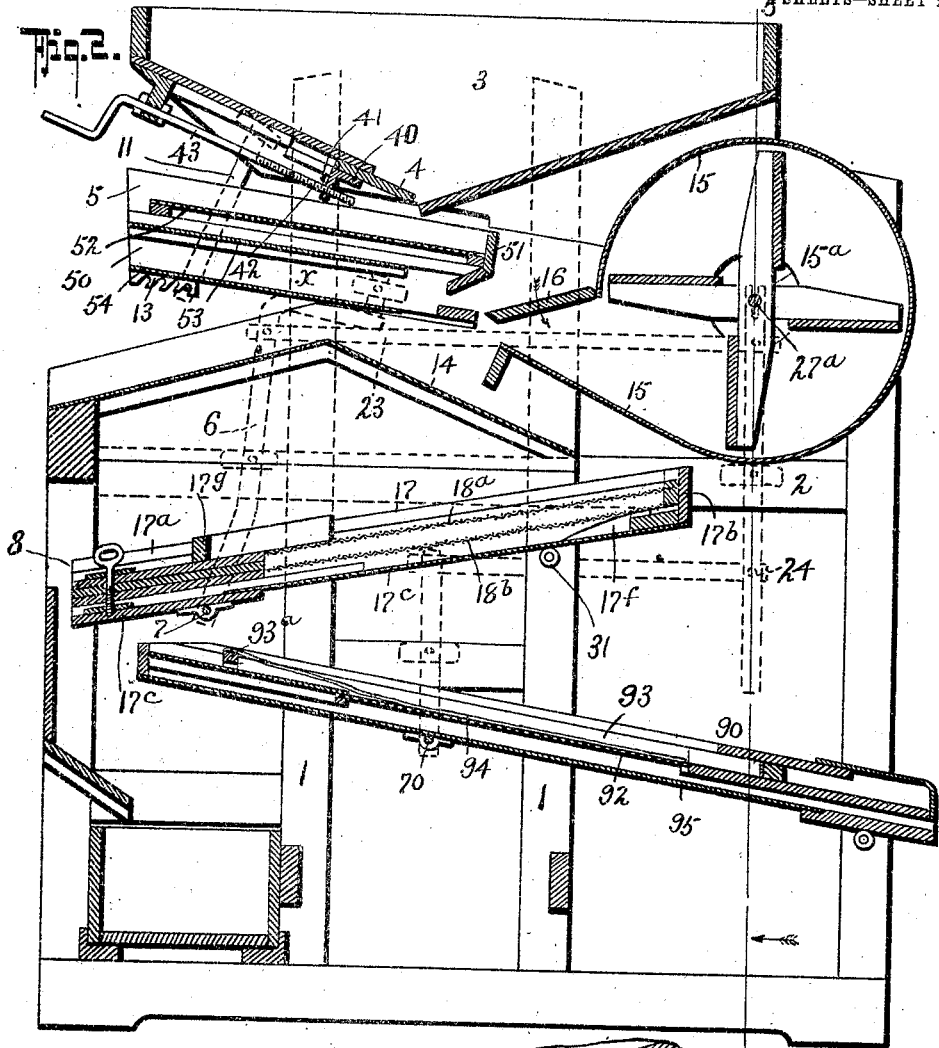
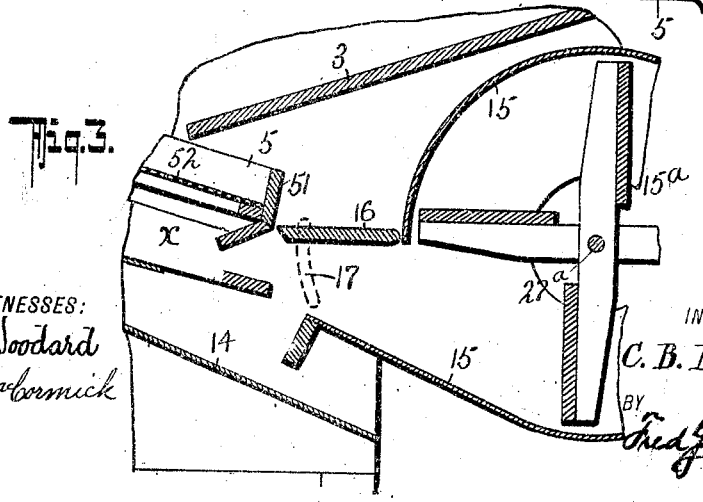

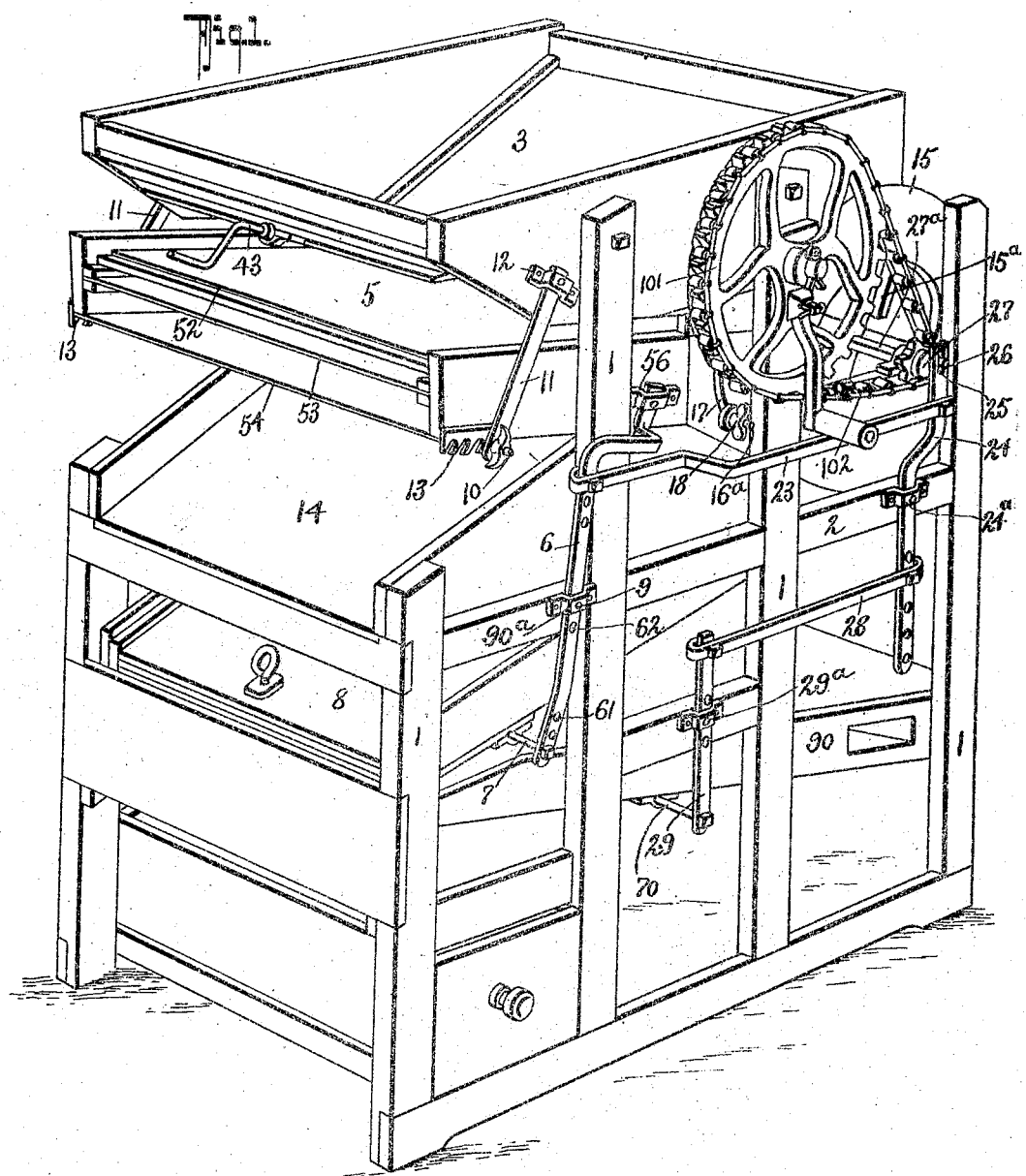

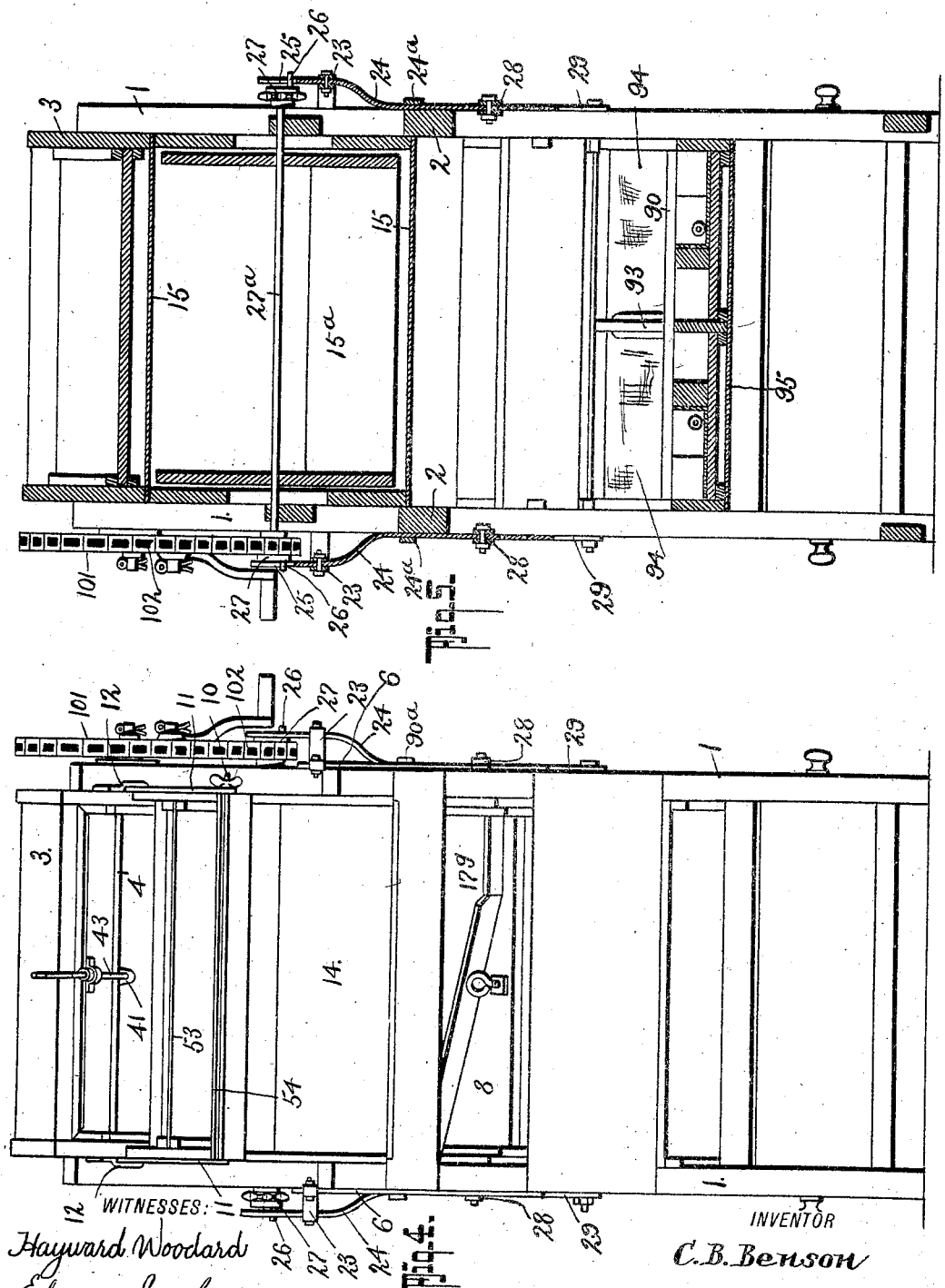

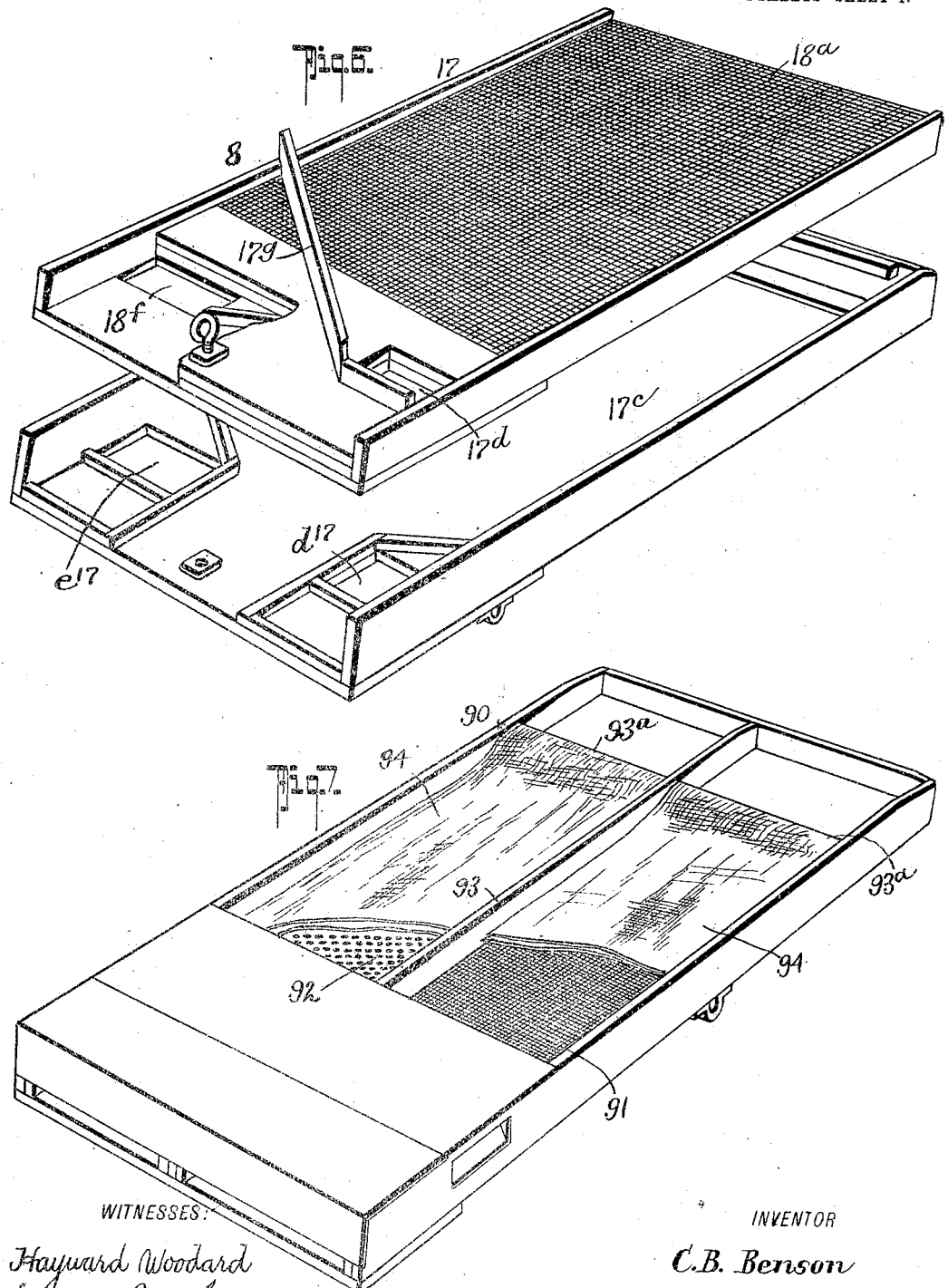

UNITED STATES PATENT OFFICE.

CHARLES B. BENSON, OF TIPPECANOE CITY, OHIO.

COMBINED SEED GRADER, CLEANER, AND PURIFIER.

965,683.

Specification of Letters Patent. Patented July 26, 1910.

Application filed July 20, 1909. Serial No. 508,582

*To all whom it may concern:*

Be it known that I, CHARLES B. BENSON, residing at Tippecanoe City, in the county of Miami and State of Ohio, have invented a new and Improved Combined Seed Grader, Cleaner, and Purifier, of which the following is a specification.

This invention relates to that type of machines that clean, purify and separate and grade the grain as it is carried therethrough, and it has for its object to provide a machine of this type, that comprehends, generally, an improved construction and arrangement of the upper shoe and the blast devices whereby the air can be readily directed to blow upwardly for blowing the light chaff and foul seeds back through the rear end of the machine and through the top shoe, or directed downwardly for blowing off the chaff and foul seeds that escape from the top shoe and out through the back of the machine and under the top shoe.

In its more complete nature, my invention embodies an improved arrangement of the top shoe, and means for imparting oblique motion thereto whereby to throw the coarse chaff over the rear of the machine to discharge onto the floor.

In its still more complete nature, my invention includes an improved construction of upper and lower shoes, the means for suspending them within the main frame, and a special construction of actuating devices for imparting the desired motions to the said shoes, my said invention, in its subordinate features, consisting of certain details of construction and peculiar combination of parts all of which will be hereinafter fully described, specifically pointed out in the appended claims and illustrated in the accompanying drawings, in which:—

Figure 1, is a perspective view of my improved machine. Fig. 2, is a vertical, longitudinal section of the same, the blast valve or gate being shown set to direct the fan blast below the top shoe. Fig. 3, is a detail section of a part of the machine, showing the said fan or valve as set to direct the fan blast through the top shoe. Fig. 4, is an end elevation of my improved machine. Fig. 5, is a transverse section on the line 5—5 on Fig. 2, looking in the direction of the arrow. Fig. 6, is a perspective view of the screens of the middle shoe. Fig. 7, is a similar view of the bottom shoe.

In the practical construction, my machine has opposite side frames, each built up of four legs or uprights 1—1 that are firmly braced by the horizontal beams 2—2 in a manner clearly understood from Fig. 1, by reference to which it will be noticed that a hopper 3 is mounted between the upper ends of the members 1 and is bolted or otherwise made fast thereto as shown in the drawings, although it may be adjustably supported so it may be raised or lowered, as desired.

4 designates a regulating slide mounted at the discharging throat of the hopper for controlling the grain outflow therefrom, the said slide being mounted at the ends in suitable guides on the hopper frame, and is provided with a pendent bracket 40 that is threaded as at 41 to receive the threaded shank 42 of a crank rod 43, as clearly shown by Figs. 1 and 2.

5 designates the short top shoe that comprises the end frame members 50—50, a cross piece 51 at the lower end that forms a check against the discharge of the grain over the lower end of the coarse screen 52 mounted over a solid sheet metal bottom plate 53, which in connection with another similar plate 54 below it and also mounted on the frame members 50, forms an air chamber $x$, presently again referred to.

The top shoe 5 is supported at the inner or lower end, on the crank strap irons 6—6, the upper ends of which pivotally connect with brackets 56 on the sides of the shoe 90 and whose lower ends have a series of apertures 61 for adjustably receiving the cross rod 7 that supports the outer or lower end of the middle shoe 8, the said irons 6 also having a number of apertures 62 about midway the long portions thereof for adjustably receiving pivot pins 9 that engage the bracket irons 90ª secured to the cross timbers 2 of the framing as will be clearly understood from Fig. 1, by reference to which it will be also noticed the upper end of the shoe 5 is detachably supported on a cross rod 10 held in the lower ends of short strap iron links 11—11, the upper ends of which are pivotally hung in brackets 12—12 on the sides of the hopper frame, and to provide for vertical adjustment of the rear end of the shoe 5 the same has notched plates 13—13 to receive the rod 10, as shown.

14 designates a substantially inverted V-shaped bottom or partition located under the top shoe 5 and whose inner end extends under the inner bottom end of the fan casing 15, as best shown in Fig. 2, which also shows the discharge mouth of the casing 15 in which the blast fan 15ª operates, as in line with the lower inner end of the shoe 5.

Operably mounted in the discharge mouth of the fan casing is a valve board 16, the opposite ends of which have short pintles 16ª that extend through the segmental slots 17—17 in the sides of the fan casing and carry clamp or wing nuts 18—18 as shown, the said slots and the board 16 being relatively so arranged with respect to the shoe 5 and the fan casing so that when the board 16, which is hingedly mounted, is swung to its upper position, as shown in Fig. 3 the air blast is directed through the air chamber $x$ in the upper shoe for blowing the light chaff and foul seeds through the top shoe from whence it drops to the floor, and when swung down to the position shown in Fig. 2, the air blast is directed to direct the blast under the shoe to blow out the chaff and foul seeds through chamber 6 under the top shoe.

The partially cleaned grain that passes from the shoe 5 drops onto the inwardly inclined portion of bottom 14 and into the upper end of the second or intermediate shoe 17, the construction of which is best shown in Figs. 2 and 6, and the same consists of a bottom frame composed of the sides 17ª, an upper closure end 17ᵇ and a solid bottom 17ᶜ having a pair of oppositely located openings 17ᵈ—18ᶠ, see Fig. 6. A second frame is slidably mounted on the frame sides 17ª and rests on cleats 17ᶠ on the said sides and the said frame includes a pair of separating screens 18ª—18ᵇ of different mesh, see Fig. 2. Shoe 17 is held at an inclination opposite to that of the upper shoe, and the grain that drops from the said upper shoe falls on the upper screen 18ª and such grain that passes down over the upper screen is deflected by a guide strip 17ᵍ to the opening 17ᵈ which, when the sections of shoe 17 are operatively combined, communicates with opening $d^{17}$ in the frame bottom 17ᶜ. The separations that pass through screen 18ª pass onto the lower screen 18ᵇ and travel down said screen and are deflected to a discharge opening 18ᶠ that empties through the opening $e^{17}$ in the frame bottom 17ᶜ. The inner end of the middle shoe is detachably supported on roller bearings 31, see Fig. 2 and since the outer or lower end is supported by the cross rod 7, in turn mounted in the pendent members 6, it follows that when the said members 6 are oscillated, an oblique motion is imparted to the upper shoe that acts to throw the coarse chaff over the rear end of the machine to fall on the rear downwardly inclined sheet metal bottom to the floor. The bottom shoe is oscillated vertically, its inner end resting on the rollers 31 as the fulcrum, the front end being swung by the oscillation of the members 6—6.

For imparting the desired motion to the bars 6—6, bent strap iron links 23 are secured at one end to the said bars 6 and at the other end to rocker bars 24 that are fulcrumed in brackets 24ª on the central set of beams 2, the upper ends of said rocker bars being bifurcated as at 25 to receive the ends of the crank pintles 26 on the chain wheels 27 mounted on the fan shaft 27ª. Rocker bars 24 have a series of perforations in the lower end for adjustably connecting links 28—28 which also connect with the upper ends of oscillating levers 29—29 pivotally mounted at 29ª on the main frame and whose lower ends are apertured to receive the opposite ends of a cross rod 70 that couples with the lowermost shoe 90 and imparts the required vibratory motion as the machine is operated, through the medium of the crank chain wheel 101, over which takes the endless chain 102 that also takes over chain wheel 27 on fan shaft 27ª.

The first and second grade of grain after passing through the outlets in the middle shoe, drops onto a blank surface at the upper end of the third or bottom shoe 90, the construction of which is best shown in Figs. 2 and 7 by reference to which it will be noticed the shoe has two sets of screens 91—92 and it is divided by a central, longitudinal portion 93 whereby to maintain the proper separation of the different grades of grain that pass from the second or middle screen. The grain drops onto the upper blank end of the third shoe and the sticks and rubbish in passing down are stopped by bridge pieces 93ª over which the said rubbish and sticks pass onto the flexible flaps 94, preferably oil cloth, that are attached at the upper ends to the bridge pieces 93ª and are loosely held on their respective screen surfaces 94—94 over which the grain passes as it is covered by the flaps, which separate the trash therefrom, and which also assists the grain in passing down through the screen, it being received on other and final screening surfaces 95—95, the different grades of grain being discharged through separate outlets as will be clearly understood by reference to the drawings, particularly Figs. 6 and 7.

From the foregoing, taken in connection with the drawings, the complete construction, the operation and the general advantages of my invention will be readily apparent.

By reason of the manner in which the several shoes are constructed and relatively combined, I am enabled to obtain a high efficiency in the grading of the grain and the separation therefrom of the trash, chaff and other undesirable matter and by reason of forming the lower screen with a longitudinal partition, providing, as it were, a duplex set of screens of different mesh, a final cleaning and separation of the already cleaned and graded material is obtained.

Having thus described my invention, what I claim and desire to secure by Letters Patent, is:

1. In a machine of the class described, the combination with an upper shoe having a plurality of superposed screens and a separate discharge for each screen at the delivery end thereof; of a lower shoe, said lower shoe including two separate and independent longitudinal screening surfaces mounted side by side, said screening surfaces being of different mesh and held to receive the graded discharges from the upper shoe, and having a separate discharge for each of the said surfaces, and means at the receiving end of the said lower shoe for deflecting the sticks and trash, as set forth.

2. In a machine of the class described, the combination with an upper shoe having a plurality of superposed screens and a separate discharge for each screen at the delivery end thereof; of a lower shoe having two distinct longitudinal screening surfaces of different mesh that receive the graded discharges from the upper shoe, said two screening surfaces being mounted side by side, and having a separate discharge for each of the said surfaces, and bridge members at the receiving end of each of the screening surfaces for deflecting the trash, sticks, etc.

3. In a machine of the class described, the combination with an upper shoe having a plurality of superposed screens and a separate discharge for each screen at the delivery end thereof; of a lower shoe having two distinct longitudinal screening surfaces of different mesh that receive the graded discharges from the upper shoe, said screening surfaces being mounted side by side, and having a separate discharge for each of the said surfaces, and bridge members at the receiving end of the said screening surfaces for deflecting the trash and sticks and flexible members secured to the bridge members and loosely sustained upon the said screening surfaces.

CHARLES B. BENSON.

Witnesses:
GEO. B. HANN,
RANDOLPH F. SELLERS.